United States Patent
Li et al.

(10) Patent No.: US 11,403,977 B2
(45) Date of Patent: Aug. 2, 2022

(54) DISPLAY PANEL HAVING SUBPIXEL INCLUDING FIRST DISPLAY REGION AND SECOND DISPLAY REGION, METHOD OF DRIVING DISPLAY PANEL, AND DISPLAY DEVICE

(71) Applicant: BOE TECHNOLOGY GROUP CO., LTD., Beijing (CN)

(72) Inventors: Zhongxiao Li, Beijing (CN); Wenqing Zhao, Beijing (CN); Jinye Zhu, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 254 days.

(21) Appl. No.: 16/622,978

(22) PCT Filed: May 17, 2019

(86) PCT No.: PCT/CN2019/087457
§ 371 (c)(1),
(2) Date: Dec. 16, 2019

(87) PCT Pub. No.: WO2020/015446
PCT Pub. Date: Jan. 23, 2020

(65) Prior Publication Data
US 2021/0335160 A1 Oct. 28, 2021

(30) Foreign Application Priority Data

Jul. 20, 2018 (CN) .......................... 201810804500.9

(51) Int. Cl.
*G09G 3/00* (2006.01)
*G09G 3/3258* (2016.01)
*G09G 3/36* (2006.01)

(52) U.S. Cl.
CPC ........... *G09G 3/003* (2013.01); *G09G 3/3258* (2013.01); *G09G 3/3648* (2013.01);
(Continued)

(58) Field of Classification Search
CPC .... G09G 3/003; G09G 3/3258; G09G 3/3648; G09G 2300/0426; G09G 2300/0439; G09G 2320/0686
See application file for complete search history.

(56) References Cited

U.S. PATENT DOCUMENTS 9,910,328 B2 * 3/2018 Jeong ................ G02F 1/136213
10,345,645 B2 * 7/2019 Lu ..................... G02F 1/133621
(Continued)

FOREIGN PATENT DOCUMENTS

| CN | 101236345 A | 8/2008 |
|---|---|---|
| CN | 202615083 U | 12/2012 |

(Continued)

OTHER PUBLICATIONS

European Search report issued for EP Application No. 19837465.4, dated Mar. 3, 2022, 16 pages.
(Continued)

*Primary Examiner* — Kwang-Su Yang
(74) *Attorney, Agent, or Firm* — Dave Law Group LLC; Raj S. Dave

(57) ABSTRACT

A display panel and a method of driving a display panel are provided. The display panel includes at least one display subpixel. The display subpixel includes a first display region located at a middle part of the display subpixel and a second display region located at a peripheral part of the display subpixel in a first direction; and the display subpixel is configured to enable brightness of the second display region to be greater than brightness of the first display region in a case of displaying an image.

19 Claims, 9 Drawing Sheets

(52) U.S. Cl.
CPC ............ *G09G 2300/0426* (2013.01); *G09G 2300/0439* (2013.01); *G09G 2320/0686* (2013.01)

(56) References Cited

U.S. PATENT DOCUMENTS

| | | | |
|---|---|---|---|
| 2008/0024688 A1* | 1/2008 | Mizoguchi | G02F 1/134363 349/33 |
| 2010/0110317 A1* | 5/2010 | Chen | G02F 1/133553 349/15 |
| 2011/0317105 A1 | 12/2011 | Miyazaki | |
| 2012/0069255 A1* | 3/2012 | Takagi | G02B 3/14 349/15 |
| 2012/0182512 A1* | 7/2012 | Sakurai | G02F 1/133528 349/141 |
| 2012/0293503 A1* | 11/2012 | Miyazawa | H04N 13/359 345/419 |
| 2016/0246124 A1 | 8/2016 | Du et al. | |
| 2017/0150131 A1 | 5/2017 | Van Putten et al. | |
| 2017/0371192 A1 | 12/2017 | Coleman et al. | |

FOREIGN PATENT DOCUMENTS

| | | |
|---|---|---|
| CN | 104460114 A | 3/2015 |
| CN | 104503160 A | 4/2015 |
| CN | 104965363 A | 10/2015 |
| CN | 108196406 A | 6/2018 |
| EP | 2762965 A1 | 8/2014 |
| WO | 2017069213 A1 | 4/2017 |

OTHER PUBLICATIONS

European Search Report issued for EP Application No. 19837465.4, dated May 31, 2022, 16 pages.

* cited by examiner

DISPLAY PANEL HAVING SUBPIXEL INCLUDING FIRST DISPLAY REGION AND SECOND DISPLAY REGION, METHOD OF DRIVING DISPLAY PANEL, AND DISPLAY DEVICE

CROSS-REFERENCE TO RELATED APPLICATIONS

The present application is the U.S. national stage of International Patent Application No. PCT/CN2019/087457, filed May 17, 2019, which claims the benefit of priority to Chinese patent application No. 201810804500.9, filed on Jul. 20, 2018, the disclosures of which are incorporated herein by reference in their entireties as a part of the present application.

TECHNICAL FIELD

Embodiments of the present disclosure relate to a display panel, a method of driving a display panel, and a display device.

BACKGROUND

In recent years, a three-dimensional (3D) display has become a major development trend in the display field. A 3D display device is based on a principle that a left eye and a right eye of a person receive a left eye image and a right eye image having a parallax, respectively, and then a brain superimposes the left eye image and the right eye image to form a stereoscopic vision. The 3D display device mainly includes two types, i.e., an auxiliary 3D display device and a naked eye 3D display device. Although a current mainstream 3D display device is usually the auxiliary 3D display device, the auxiliary 3D display device requires a user to wear glasses (for example, chromatic-aberration glasses, polarized glasses, or shutter glasses) or a helmet, so that the left eye image and the right eye image can be respectively fed into the left eye and the right eye of the user. The discomfort caused by the glasses or the helmet prevents further development of the auxiliary 3D display device and prompts the development of the naked eye 3D display device in the field.

SUMMARY

At least one embodiment of the present disclosure provides a display panel, which includes a display subpixel. The display subpixel includes a first display region located at a middle part and a second display region located at two sides of the first display region in a first direction; and in a process of displaying a subpixel of an image, brightness of the second display region is greater than brightness of the first display region.

For example, in at least one example of the display panel, the display panel is a liquid crystal display panel, the display subpixel includes a pixel electrode and a common electrode which are both located in the first display region and the second display region, a part of the pixel electrode located in the first display region is electrically connected to a part of the pixel electrode located in the second display region, and a part of the common electrode located in the first display region is electrically connected to a part of the common electrode located in the second display region; and in a case where an identical driving voltage is applied to the part of the pixel electrode located in the first display region and the part of the pixel electrode located in the second display region, a liquid crystal driving electric field formed by the pixel electrode and the common electrode in the second display region is not equal to a liquid crystal driving electric field formed by the pixel electrode and the common electrode in the first display region.

For example, in at least one example of the display panel, in a case where the identical driving voltage is applied to the part of the pixel electrode located in the first display region and the part of the pixel electrode located in the second display region, the liquid crystal driving electric field formed by the pixel electrode and the common electrode in the second display region is smaller than the liquid crystal driving electric field formed by the pixel electrode and the common electrode in the first display region.

For example, in at least one example of the display panel, the display subpixel includes a liquid crystal layer and a dielectric material layer; the dielectric material layer is between the liquid crystal layer and the pixel electrode or between the liquid crystal layer and the common electrode, and the dielectric material layer includes a first dielectric unit located in the first display region and a second dielectric unit located in the second display region; and an equivalent dielectric constant of the second dielectric unit is smaller than an equivalent dielectric constant of the first dielectric unit.

For example, in at least one example of the display panel, a thickness of the second dielectric unit is equal to a thickness of the first dielectric unit, and a dielectric constant of the second dielectric unit is smaller than a dielectric constant of the first dielectric unit.

For example, in at least one example of the display panel, in a case where the identical driving voltage is applied to the part of the pixel electrode located in the first display region and the part of the pixel electrode located in the second display region, the liquid crystal driving electric field formed by the pixel electrode and the common electrode in the second display region is greater than the liquid crystal driving electric field formed by the pixel electrode the common electrode in the first display region.

For example, in at least one example of the display panel, at least one of the pixel electrode and the common electrode is a comb electrode, and a pitch distance of a part of the comb electrode in the second display region is smaller than a pitch distance of a part of the comb electrode in the first display region.

For example, in at least one example of the display panel, the display panel is an organic light emitting diode display panel, the display subpixel includes an organic light emitting diode located in the first display region and the second display region, a part of the organic light emitting diode located in the first display region is electrically connected to a part of the organic light emitting diode located in the second display region, and the part of the organic light emitting diode located in the first display region and the part of the organic light emitting diode located in the second display region are configured to receive an identical driving voltage; and in a case where the identical driving voltage is applied to the part of the organic light emitting diode located in the first display region and the part of the organic light emitting diode located in the second display region, a density of a driving current formed by the organic light emitting diode in the second display region is greater than a density of a driving current formed by the organic light emitting diode in the first display region.

For example, in at least one example of the display panel, a resistivity of the part of the organic light emitting diode located in the second display region is smaller than a resistivity of the part of the organic light emitting diode located in the first display region.

For example, in at least one example of the display panel, the display subpixel further comprises a light dispersion structure provided on a light emitting side of the first display region; and the light dispersion structure is configured to diffuse light emitted from the first display region into the second display region.

For example, in at least one example of the display panel, the display subpixel includes a common driving circuit configured to simultaneously drive the first display region and the second display region.

For example, in at least one example of the display panel, the display subpixel includes a first driving circuit and a second driving circuit which are at least partially independent and are configured to drive the first display region and the second display region, respectively.

For example, in at least one example of the display panel, the display subpixel includes a first pixel electrode located in the first display region and a second pixel electrode located in the second display region; the first pixel electrode is insulated from the second pixel electrode; and the first pixel electrode and the second pixel electrode are electrically connected to the first driving circuit and the second driving circuit, respectively.

For example, in at least one example of the display panel, the brightness of the second display region is 1.05~1.25 times as large as the brightness of the first display region.

For example, in at least one example of the display panel, a size of the second display region in the first direction is smaller than a size of the display subpixel in the first direction; and a ratio of the size of the second display region in the first direction to the size of the display subpixel in the first direction is 0.01~0.5.

For example, in at least one example of the display panel, the size of the second display region in the first direction is smaller than or equal to a size of a light transmission region in the first direction; and a ratio of the size of the second display region in the first direction to the size of the light transmission region in the first direction is 0.7~1.

For example, in at least one example of the display panel, the display panel further includes a parallax barrier and a plurality of display subpixels; the parallax barrier is on a light emitting side of the display subpixel and includes light shielding regions and light transmission regions which are alternately arranged in the first direction; and the plurality of display subpixels are arranged in parallel in the first direction.

At least one embodiment of the present disclosure further provides a display device, which includes the display panel provided by at least one embodiment of the present disclosure.

At least one embodiment of the present disclosure further provides a method of driving a display panel, and the method includes: applying a first display data voltage to a first display region of a display subpixel of the display panel; and applying a second display data voltage to a second display region of the display subpixel of the display panel. In a process of displaying a subpixel of an image, brightness of the second display region is greater than brightness of the first display region; and the first display region is located at a middle part of the display subpixel, and the second display region is located at two sides of the first display region in a first direction.

For example, in at least one example of the method of driving the display panel, the first display data voltage is different from the second display data voltage; the display subpixel includes a first driving circuit and a second driving circuit which are at least partially independent and are configured to drive the first display region and the second display region, respectively; and the first display data voltage is applied to the first display region through the first driving circuit, and the second display data voltage is applied to the second display region through the second driving circuit.

For example, in at least one example of the method of driving the display panel, the first display data voltage is equal to the second display data voltage.

For example, in at least one example of the method of driving the display panel, the first display data voltage is equal to the second display data voltage; the display subpixel comprises a common driving circuit configured to simultaneously drive the first display region and the second display region; and the common driving circuit applies the first display data voltage to the first display region, and applies the second display data voltage to the second display region.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1A:
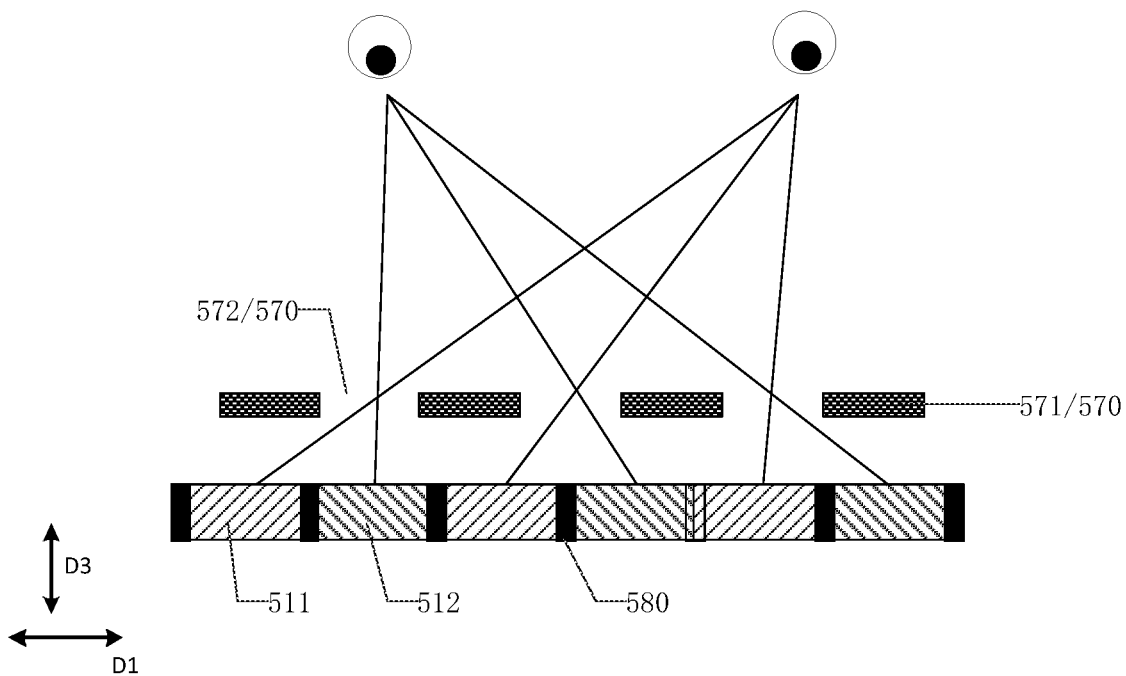
FIG. 1A is a schematic cross-sectional view of a display panel.

FIG. 1A is a schematic cross-sectional view of a display panel. As illustrated in FIG. 1A, the display panel includes a display array layer and a parallax barrier 570 provided on a light emitting side of the display array layer. The display array layer and the parallax barrier 570 are stacked, for example, in a third direction D3. The display array layer includes first display pixels 511 and second display pixels 512 which are alternately arranged in a first direction D1, and black matrix units 580 provided between the first display pixels 511 and the second display pixels 512. For example, a plurality of the first display pixels 511 are respectively configured to display a plurality of first image pixels corresponding to a first image, and the first image can be obtained by combining the plurality of first image pixels. A plurality of the second display pixels 512 are respectively configured to display a plurality of second image pixels corresponding to a second image, and the second image can be obtained by combining the plurality of second image pixels. There is a parallax between the first image and the second image, which can be used to achieve a stereoscopic display. The parallax barrier 570 includes light shielding regions 571 and light transmitting regions 572 which are alternately arranged in the first direction. The first display pixels 511 and the second display pixels 512 are respectively and partially overlapped with an orthographic projection of the light shielding regions 571 on the display array layer and are exposed from the light transmitting regions 572. Under the shielding of the parallax barrier 570, the light emitted by the first display pixels 511 is received by the user's left eye, and the light emitted by the second display pixels 512 is received by the user's right eye. After the user's brain superimposes an image received by the left eye and an image received by the right eye, the user can perceive a three-dimensional (3D) image. Thus, the display panel illustrated in FIG. 1A has a 3D display function.

Inventors of the present disclosure note in the study that a human eye viewing region (eyebox) 550 of the 3D display panel illustrated in FIG. 1A is small, and thus, in a case where the user's eye are located outside the human eye viewing region 550, problems of moiré and image crosstalk (the user's left eye sees an image corresponding to the right eye) may occur. In a case where the moiré and the image crosstalk are too severe, the human eye cannot observe the 3D image, and in this case, the region where the user's eyes are located is described as a dead region. In order to view an ideal 3D image, the user's eyes need to remain in the human eye viewing region 550 at all times, thereby reducing the user's experience. Although a position of the human eye viewing region 550 of the 3D display panel can be adjusted by using an eyeball tracking device, a response time of the eyeball tracking device makes it difficult for the eyeball tracking device to adjust the position of the human eye viewing region 550 based on the position of the user in real time. In the case where the human eye viewing region 550 is too small, the human eyes may leave the human eye viewing region 550 before the eyeball tracking device adjusts the position of the human eye viewing reign 550, and thus, resulting in that the human eyes can observe a 3D image with severe moiré or image crosstalk, or no 3D image even can be observed. The human eye viewing region 550 of the 3D display panel is exemplarily described below with reference to FIG. 1B, and the moiré problem is taken as an example.

Figure 1B:
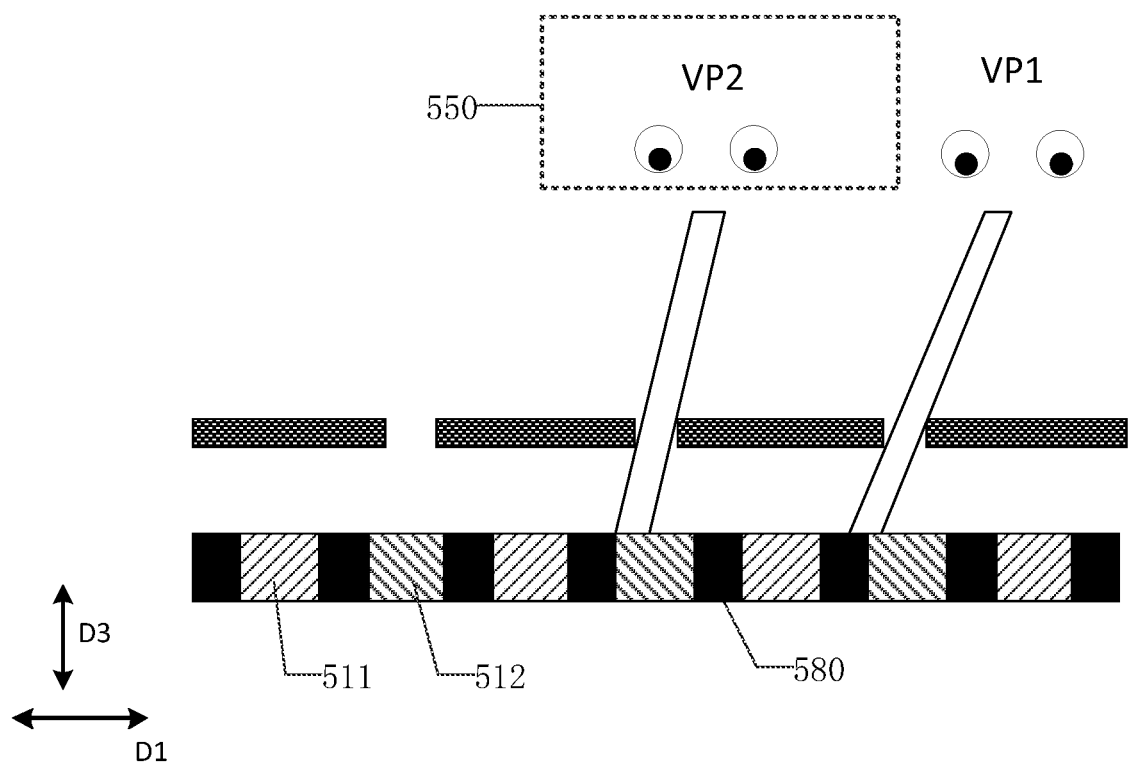
FIG. 1B is a schematic diagram for showing that a width of a black matric unit observed by a user is different in a case where the user is at different positions.

As illustrated in FIG. 1B, an observation angle in a case where the user's eyes are located at a position VP2 is not equal to an observation angel in a case where the user's eyes are located at a position VP1. In the case where the human eyes are located at the position VP1, the human eyes observe a part of the black matrix units 580 and a part of the second display pixels 512. However, in the case where the human eyes are located at the position VP1, the human eyes only observe the second display pixels 512, and cannot observe the black matrix units 580. Because no light is emitted from a region of the display array layer corresponding to the black matrix units 580, even if pixels observed by the human eyes show the same content, a light intensity received by the human eyes at the position VP2 is greater than a light intensity received by the human eyes at the position VP1. Therefore, the human eyes may perceive a change of brightness during a movement from the position VP1 to the position VP2, and an image with moiré is possible to be observed. In a case where the change of the brightness perceived by the human eyes is greater than, for example, 10%, the moiré of the image may be too noticeable and an image quality may be significantly degraded, which means that the user's eyes are already located outside the human eye viewing region. For example, the human eye viewing region can be determined based on a maximum value of the change of the brightness perceived by the human eyes. In order to enhance the user's experience, the human eye viewing region is needed to be enlarged.

The embodiments of the present disclosure provide a display panel, a method of driving a display panel, and a display device. The display panel includes a display subpixel and a parallax barrier. The parallax barrier is provided on a light emitting side of the display subpixel and includes light shielding regions and light transmission regions which are alternately arranged in a first direction. The display subpixel includes a first display region located at a middle part of the display subpixel and a second display region located at a peripheral part of the display subpixel. In a process of displaying a subpixel of an image, brightness of the second display region is greater than brightness of the first display region. By providing the first display region located at the middle part and the second display region located at the peripheral part (for example, at two sides of the first display region in the first direction), and enabling that the brightness of the second display region is greater than the brightness of the first display region, a width of the black matrix units that the human eyes can observe can be increased, and thus, the size of the human eye viewing region is increased.

The display panel according to the embodiments of the present disclosure is described non-restrictively with reference to several embodiments below. As described below, in case of no conflict, different features in these specific embodiments may be combined with each other to obtain new embodiments. These new embodiments are further fall within the protection scope of the present disclosure.

Figure 2A:
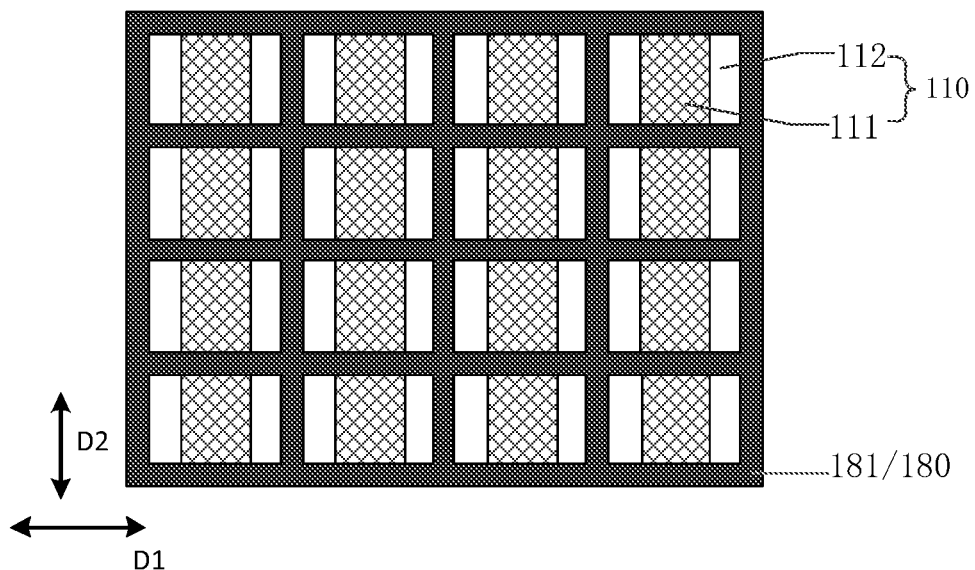
FIG. 2A is a schematic plane view of a display panel provided by at least one embodiment of the present disclosure.
Figure 2B:
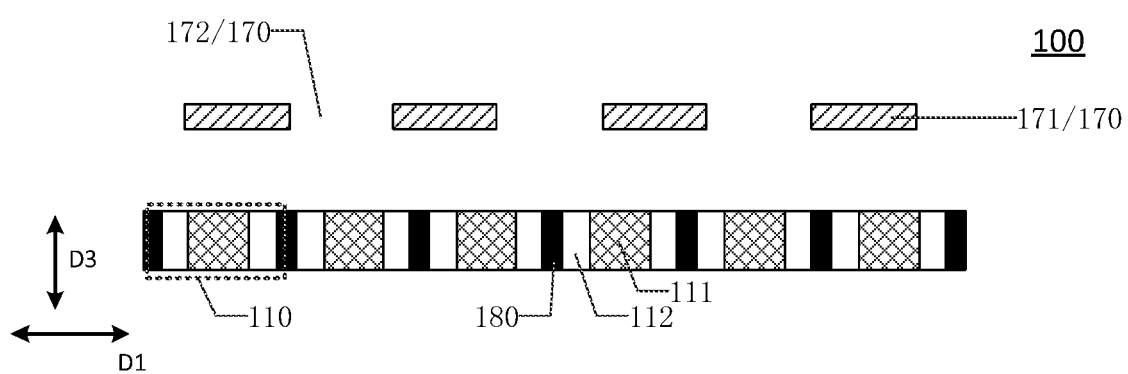
FIG. 2B is a schematic cross-sectional view of a display panel provided by at least one embodiment of the present disclosure.

For example, FIG. 2A and FIG. 2B respectively show a schematic plane view and a schematic cross-sectional view of a display panel provided by at least one embodiment of the present disclosure. As illustrated in FIG. 2A and FIG. 2B, a display panel 100 includes a display subpixel 110 and a parallax barrier 170 (FIG. 2A does not show the parallax barrier) provided on a light emitting side of the display subpixel 110. The display subpixels 110, for example, are repeatedly arranged in a first direction D1 and a second direction D2, which form a display array layer. The parallax barrier 170 includes light shielding regions 171 and light transmission regions 172 which are alternately arranged in the first direction D1. The first direction D1 is, for example, a horizontal direction, that is, a lateral direction. The second direction D2 is, for example, a vertical direction perpendicular to the first direction D1.

It should be noted that, sizes of the light shielding region 171 and the light transmission region 172 in the first direction D1 and an interval distance between the parallax barrier 170 and the display subpixel 110 in the third direction D3 may be equal to those in a related design. Thereby, parameters such as a working distance of the display panel 100 (for example, a distance between a viewing position of the display panel 100 and a light emitting surface of the display panel 100) can be equal to those of a related display panel (for example, a display panel illustrated in FIG. 1A). The third direction D3 is, for example, a direction perpendicular to the first direction D1 and the second direction D2.

As illustrated in FIG. 2A and FIG. 2B, the display subpixel 110 includes a first display region 111 located at the middle part of the display subpixel 110, a second display region 112 located at the peripheral part of the display subpixel 110, and a black matrix unit 180 on a side of the second display region 112 away from the first display region 111. The second display region 112 may be provided at two sides of the first display region 111 in the first direction D1, for example, and is symmetrically arranged with respect to a central axis of the display subpixel 110 in the first direction D1. The central axis in the first direction D1, for example, extends along the second direction D2. For example, each of the display subpixels 110 (the first display region 111 and the second display region 112 of each of the display subpixels 110) is configured to display one subpixel of a display image. In the same display subpixel, colors of light emitted by the first display region 111 and the second display region 112 are the same, and the light emitted from the first display region 111 and the light emitted from the second display region 112 have the same polarization state. It should be noted that, three display subpixels 110 adjacent in the first direction D1 may respectively emit red light, green light, and blue light, which are combined to obtain one pixel, but the embodiments of the present disclosure are not limited thereto. Relative to FIG. 2A and FIG. 2B, in another example, the second display region 112 may be further provided at two sides of the first display region 111 in the second direction D2, except that the second display region 112 is provided at two sides of the first display region 111 in the first direction D1. For example, the second display region 112 may further be symmetrically provided with respect to a central axis of the display subpixel 110 in the second direction D2 (the central axis in the second direction D2, for example, extends along the first direction D1). Then, in this embodiment, the first display region 111 is surrounded by the second display region 112.

Figure 3:
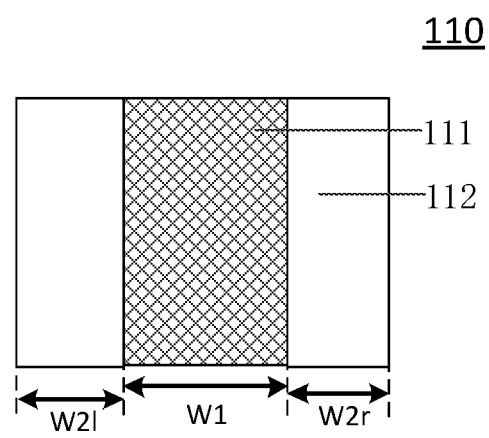
FIG. 3 is a schematic plane view of a display subpixel provided by at least one embodiment of the present disclosure.

As illustrated in FIG. 3, a size w1 of the first display region 111 in the first direction D1 and a size w2l+w2r of the second display region 111 in the first direction D1 may be designed according to actual application needs, and the embodiments of the present disclosure do not specifically limit this. For example, the size of the second display region 112 in the first direction D1 is smaller than the size of the display subpixel 110 in the first direction D1. The size of the second display region 112 in the first direction D1 is smaller than the size of the light transmission region 172 in the first direction D1. For example, a ratio of the size of the second display region 112 in the first direction D1 to the size of the display subpixel 110 in the first direction D1 is 0.01~0.5 (for example, 0.2 or 0.3). For another example, a ratio of the size of the second display region 112 in the first direction D1 to the size of the light transmission region 172 in the first direction D1 is 0.7~1 (for example, may be equal to 0.9/1.01), so that the size of the human eye viewing region is better enlarged. It should be noted that, the size of the second display region 112 in the first direction D1 is the sum of sizes of the second display region 112 provided at two sides of the first display region 111 (that is, w2l+w2r, referring to FIG. 3).

In a process of the display subpixel 110 displaying a subpixel of an image, brightness of the second display region 112 is greater than brightness of the first display region 111. In some embodiments of the present disclosure, "brightness" refers to a luminous intensity per unit area (for example, the intensity of emitted light of a display region per unit area). For example, the brightness of the second display region 112 is 1.05~1.25 times (for example, 1.15 times or 1.1 times) as large as the brightness of the first display region 111, so that the size of the human eye viewing region can be increased as much as possible. It should be noted that, because the size of the display subpixel 110 is small, uneven brightness in the display subpixel 110 does not cause display failure (for example, moiré).

Figure 2C:
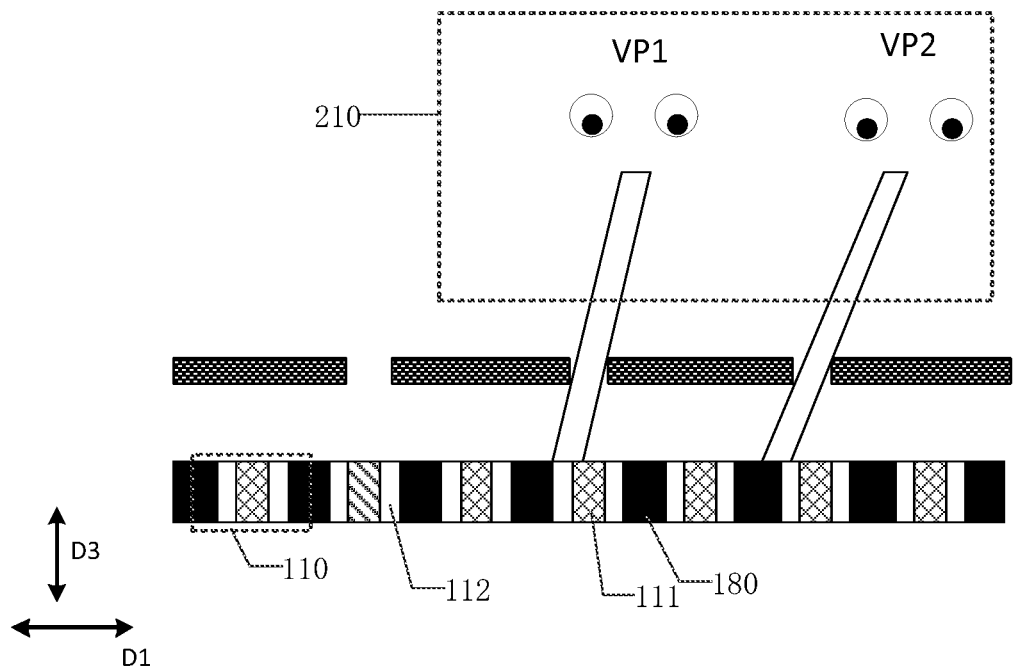
FIG. 2C is a schematic diagram for showing that a width of a black matric unit observed by a user is different in a case where the user is at different positions.

As illustrated in FIG. 2C, in a case where the user's eyes are located at the position VP2, although the user sees the black matrix unit 180, because the brightness of the second display region 112 seen by the user is greater than the brightness of the first display region 111 seen by the user, the intensity of the light received by the human eyes can be increased (for example, be increased compared with an example in which the brightness of the second display region 112 is equal to the brightness of the first display region 111). Therefore, compared to the display device 10 illustrated in FIG. 1B, for the display panel 100 illustrated in FIG. 2C, the user can perceive a decrease in the change of the brightness during movement of the user's eyes (for example, from the position VP1 to the position VP2). That is, the image that the user sees during the movement of the eyes is a normal 3D image. In this case, the display panel is capable of allowing the user's eyes to see a wider black matrix unit 180 and to move a longer distance (for example, move a longer distance in the first direction D1) without perceiving significant moiré by the user. Thus, the display panel 100 provided by at least one embodiment of the present disclosure enlarges the size of the human eye viewing region 210. In this embodiment, the size of the human eye viewing region 210 is the width of the human eye viewing region in the first direction D1.

In order to specifically explain an effect of the display panel 100 provided by the embodiments of the present disclosure on an enlargement of the size of the human eye viewing region, an exemplary illustration is given below in accompanying with an example. For example, the display panel 100 displays in a mode of two viewing images (that is, the plurality of display subpixels 110 alternately display the subpixels of the left eye image and the subpixels of the right eye image in the first direction D1). An aperture opening ratio of the parallax barrier 170 (that is, the ratio of the width of the light transmission region 172 of the parallax barrier 170 in the first direction D1 to the sum of the width of the light transmission region 172 of the parallax barrier 170 and the width of the light shielding region 171 of the parallax barrier 170 in the first direction D1) is 18%. The width of the display subpixel 110 in the first direction D1 is, for example, 100 (the unit may be micrometer, nanometer or other suitable unit, which may be determined according to actual needs). And in a case where the luminous intensity per unit area of the display subpixel 110 is 1, the size of the subpixel that the user's eyes can see through the light transmission region 172 of the parallax barrier 170 is $100 \times 18\% \times 2 = 36$. This is because one period of the parallax barrier 170 (that is, one light transmission region 172 and one light shielding region 171) corresponds to two display subpixels 110. Assuming that the width of the second display region 112 in the first direction D1 is x (x<36), the width of the black matrix unit 180 which is seen by the user's eyes allowed by the display panel 100 in the first direction D1 is y, and the brightness of the second display region 112 is 1.1 times as large as the brightness of the first display region 111, then, maximum brightness that is seen by the user's eyes allowed by the display panel 100 is $(36-x) \times 1 + x \times (1+10\%) = 36 + 0.1x$, and the width x of the second display region 112 and the width y of the black matrix unit 180 which is seen by the user's eyes allowed by the display panel 110 need to satisfy the following formula $(36+0.1x) \times 0.9 \leq 1.1x + 36 - x - y$.

In the above formula, $(36+0.1x)$ indicates the brightness value in a case where the user's eyes do not see the black matrix unit 180, $1.1x + 36 - x - y$ indicates the brightness value in a case where the user's eyes see the black matrix unit 180. In a case where the user's eyes have a moiré tolerance condition of 10% of the brightness, 90% of the brightness value in the case where the user's eyes do not see the black matrix unit 180 needs to be smaller than or equal to the brightness value in the case where the user's eyes see the black matrix unit 180.

Following two formulas can be sequentially derived according to the above formula: $36 \times 0.9 + 0.09x \leq 36 + 0.1x - y$ and $y \leq 3.6 + 0.01x$.

Further, in order to ensure that the width y of the black matrix unit 180 acquired is provided with a physical meaning, the width x of the second display region 112 and the width y of the black matrix unit 180 which is seen by the user's eyes allowed by the display panel 100 further need to satisfy the following formula: $36 - x - y \geq 0$. According to the above formulas, $y \leq 36 - x$ can be sequentially derived.

For example, in a case where the width x of the second display region 112 in the first direction D1 is x=32, the width y of the black matrix unit 180 which is seen by the user's eyes allowed by the display panel 100 is equal to 3.92. However, for the display device 10 illustrated in FIG. 1B, the width y of the black matrix unit 180 which is seen by the user's eyes allowed by the display panel 100 is $36 \times 0.1 = 3.6$. Therefore, the display panel 100 provided by at least one embodiment of the present disclosure is capable of allowing the user to see a wider black matrix unit 180, thereby allowing the user's eyes to move over a wider range. That is, the display panel 100 provided by the embodiments of the resent disclosure enlarges the size of the human eye viewing region 210.

It should be noted that, in the above embodiments, assuming that the brightness of the second display region 112 is 1.1 times as large as the brightness of the first display region 111, in a case where a relationship between the brightness of the second display region 112 and the brightness of the first display reign 111 changes, above formulas may change accordingly, and details are not described herein again.

For example, according to actual application needs, in an example, the display panel 100 may further include an eyeball tracking device. In this case, by increasing the size of the human eye viewing region, a longer time for the eyeball tracking device to adjust the position of the human eye viewing region is reserved, thereby avoiding the usage of an eyeball tracking device with a short response time and high price, and thus, the manufacturing cost of the display panel can be reduced.

It should be noted that, the width of the black matrix unit 180 in the first direction D1 may be designed according to actual application needs, which is not specifically limited in the embodiments of the present disclosure. The width BM of the black matrix unit 180 in the first direction D1 may satisfy, for example, the following formula, that is, $BM > K \times 2 \times W \times 0.1$, to avoid cross color. Here, K is an aperture opening ratio of the parallax barrier 170, and W is a width of the display subpixel 110 in the first direction D1.

In the process of the display subpixel 110 displaying a subpixel of an image, a specific implementation method to enabling that the brightness of the second display region 112 is greater than the brightness of the first display region 111 may be designed according to actual application needs, and the embodiments of the present disclosure do not specifically restrict this.

For example, the display array layer provided by at least one embodiment of the present disclosure may be a liquid crystal display panel 100, and the liquid crystal display panel 100 may be implemented as a vertical electric field type liquid crystal display panel or a horizontal electric field type liquid crystal display panel.

Figure 4A:
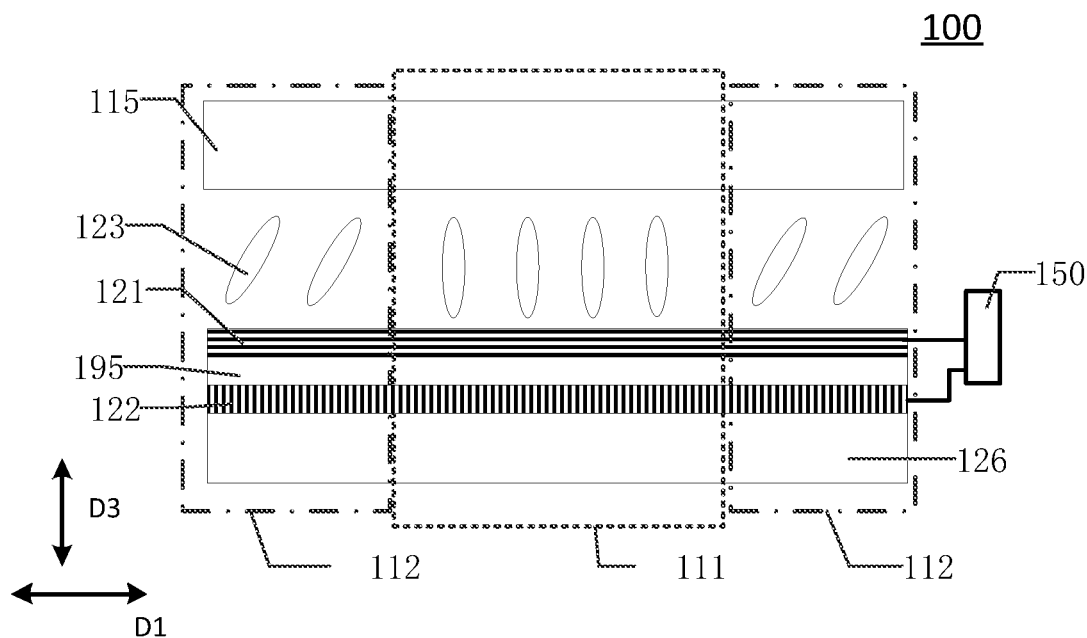
FIG. 4A is a schematic diagram of a display subpixel provided by at least one embodiment of the present disclosure.

For example, the display subpixel 110 may be implemented as the display subpixel 110 illustrated in FIG. 4A, such that the liquid crystal display panel 100 is implemented as a horizontal electric field type liquid crystal display panel of a normally black mode. As illustrated in FIG. 4A, the display subpixel 110 includes a pixel electrode 122 and a common electrode 121 which are both located in the first display region 111 and the second display region 112, an insulating dielectric layer 195 between the pixel electrode 122 and the common electrode 121, and a liquid crystal layer 123 located on a side of the common electrode 121 away from the pixel electrode 122. For example, a part of the pixel electrode located in the first display region 111 and a part of the pixel electrode located in the second display region 112 are connected to each other to form the pixel electrode 122 as a whole, and a part of the common electrode in the first display region 111 and a part of the common electrode in the second display region 112 are connected to each other to form the common electrode 121 as a whole. The pixel electrode 122 is connected to a common driving circuit 150 configured to simultaneously drive the first display region 111 and the second display region 112. Therefore, at any instant, the first display region 111 and the second display region 112 receive an identical driving signal. For example, the part of the pixel electrode located in the first display region 111 and the part of the pixel electrode located in the second display region 112 receive an identical driving voltage.

It should be noted that, in the embodiment illustrated in FIG. 4A, the part of the pixel electrode 122 located in the first display region 111 and the part of the pixel electrode 122 located in the second display region 112 may further be connected to different driving circuits. For example, according to actual application needs, for the embodiments illustrated in FIG. 5A-FIG. 5C and FIG. 6-FIG. 7, the first display region 111 and the second display region 112 may further be driven by different driving circuits.

Figure 4B:
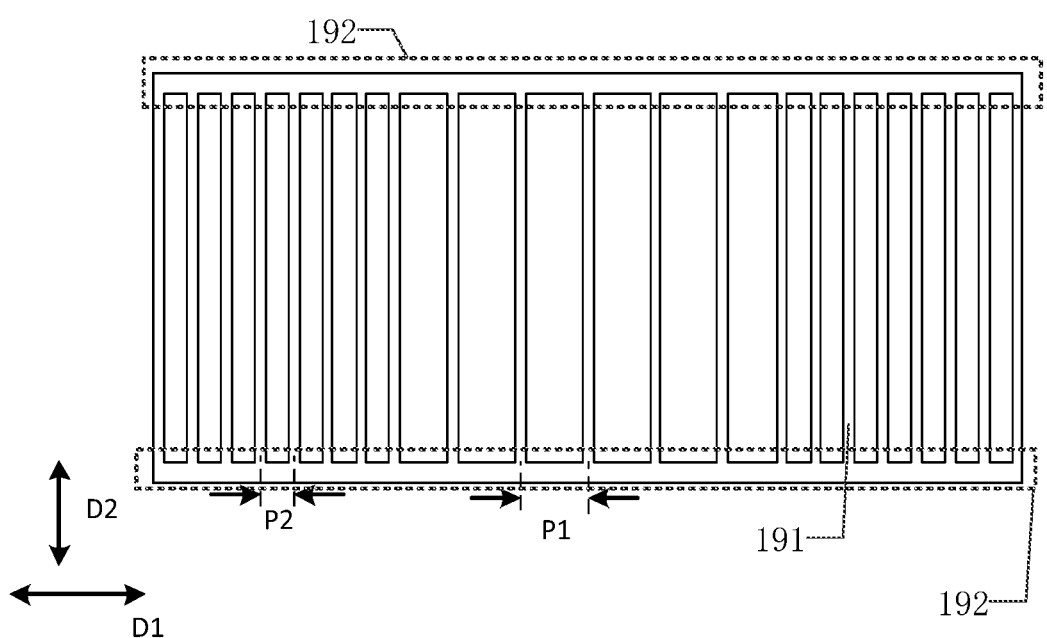
FIG. 4B is a comb electrode provided by at least one embodiment of the present disclosure.

As illustrated in FIG. 4B, at least one of the pixel electrode 122 and the common electrode 121 is a comb electrode (for example, the pixel electrode 122 is the comb electrode), and the comb electrode includes a plurality of first sub-electrodes 191 arranged in the first direction D1 and a second sub-electrode 192 extending along the first direction D1 and configured to electrically connect the plurality of first subpixels 191. As illustrated in FIG. 4B, a pitch distance P2 of a part of the comb electrode in the second display region 112 is not equal to (for example, smaller than) a pitch distance P1 of a part of the comb electrode in the first display region 111. That is, an interval distance of two adjacent first sub-electrodes 191 in the second display region 112 is not equal to (for example, smaller than) an interval distance of two adjacent first sub-electrodes 191 in the first display region 111. For the comb electrode, an electric field strength E, a voltage U applied to the comb electrode, and the pitch distance d of the comb electrode satisfy the equation E=U/d. Therefore, the smaller the pitch distance d of the comb electrode is, the larger the electric field strength E is. In this case, in a case where the common driving circuit 150 applies the driving voltage on the pixel electrode 122, a liquid crystal driving electric field formed by the pixel electrode 122 and the common electrode 121 in the second display region 112 is not equal to (for example, larger than) a liquid crystal driving electric field formed by the pixel electrode 122 and the common electrode 121 in the first display region 111. Therefore, a transmissivity of a part of the liquid crystal layer 123 located in the second display region 112 is greater than a transmissivity of a part of the liquid crystal layer 123 located in the first display region 111. Therefore, the brightness of the second display region 112 is greater than the brightness of the first display region 111.

The following is needed to be explained.

(1) The comb electrode is not limited to the structure including two second sub-electrodes 192 illustrated in FIG. 4B, and according to actual application needs, the comb electrode may include only one second sub-electrode 192.

Figure 4C:
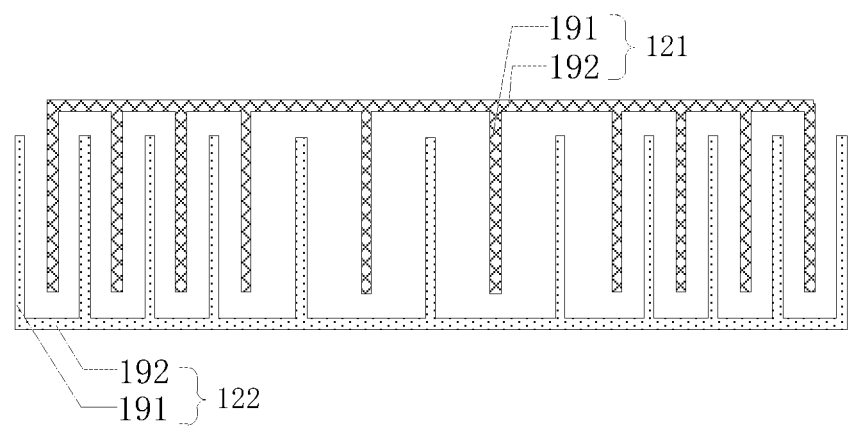
FIG. 4C is a combined structure of a pixel electrode and a common electrode provided by at least one embodiment of the present disclosure.

(2) In a case where both the pixel electrode 122 and the common electrode 121 are implemented as the comb electrodes, and each of the comb electrodes includes only one second sub-electrode, as illustrated in FIG. 4C, the pixel electrode 122 and the common electrode 121 may be provide in a same plane. In this case, the first sub-electrodes of the pixel electrode 122 and the first sub-electrodes of the common electrode 121 are alternately arranged in the first direction D1 and are electrically insulated from each other, and the second sub-electrode of the pixel electrode 122 and the second sub-electrode of the common electrode 121 are oppositely provided in the second direction D2.

(3) The positional relationship of the pixel electrode 122 and the common electrode 121 with respect to the liquid crystal layer 123 is not limited to the positional relationship illustrated in FIG. 4A, and according to actual application needs, the pixel electrode 122 may be closer to the liquid crystal layer 123 than the common electrode 121.

(4) According to actual application needs, the liquid crystal display panel 100 illustrated in FIG. 4A can further be implemented as a horizontal electric field type liquid crystal display panel of a normally white mode. In this case, the pitch distance P2 of the comb electrode in the second display region 112 may be greater than the pitch distance P1 of the comb electrode in the first display region 111, so that in the case where the common driving circuit 150 applies the driving voltage to the pixel electrode 122, the liquid crystal driving electric field formed by the pixel electrode 122 and the common electrode 121 in the second display region 112 is smaller than the liquid crystal driving electric field formed by the pixel electrode 122 and the common electrode 121 in the first display region 111. Therefore, the transmissivity of the part of the liquid crystal layer 123 located in the second display region 112 is greater than the transmissivity of the part of the liquid crystal layer 123 located in the first display region 111, so that the brightness of the second display region 112 is greater than the brightness of the first display region 111.

(5) The present disclosure illustrates the display panel provided by the embodiments of the present disclosure with the case that the second display region is located at two sides of the first display direction in the first direction. But the embodiments of the present disclosure are not limited thereto. According to actual application needs, the second display region may be provided not only at two sides of the first display region in the first direction, but also at two sides of the first display region in the second direction. In this case, the second display region is provided around the first display region. Therefore, the size of the human eye viewing region can be increased not only in the first direction but also in the second direction, thereby increasing the user's freedom degree of usage (for example, allowing the user to change a placement direction of the display screen).

Figure 5A:
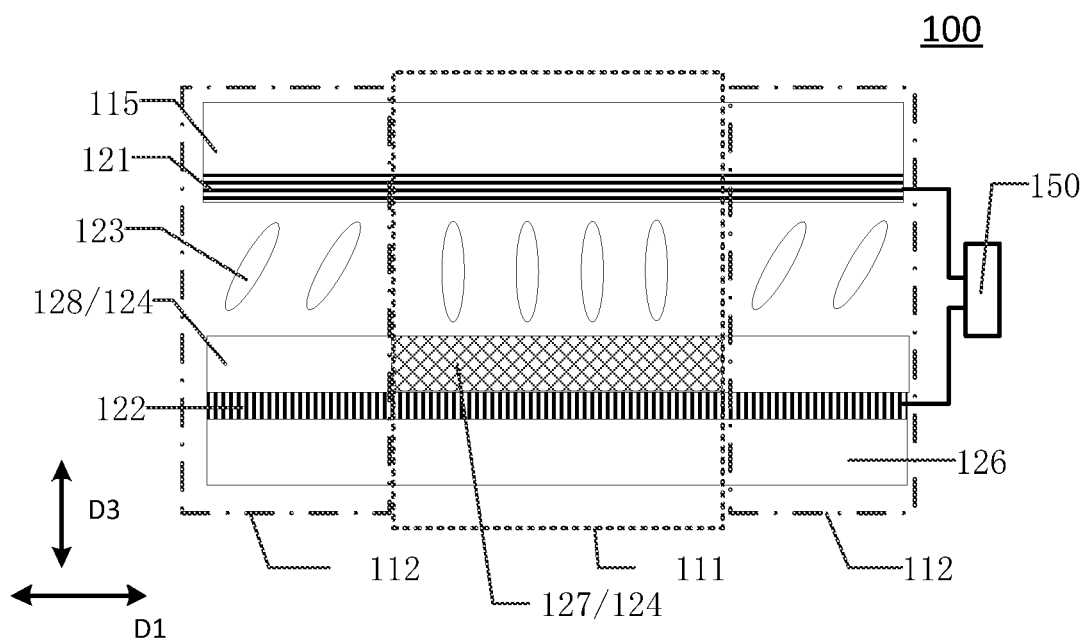
FIG. 5A is a schematic diagram of another display subpixel provided by at least one embodiment of the present disclosure.

For example, the display subpixel 110 may be implemented as the display subpixel 110 illustrated in FIG. 5A, such that the liquid crystal display panel 100 is implemented as a vertical electric field type liquid crystal display panel of a normally white mode. As illustrated in FIG. 5A, the display subpixel 110 includes the pixel electrode 122 and the common electrode 121 which are both located in the first display region 111 and the second display region 112, and the liquid crystal layer 123 located between the pixel electrode 122 and the common electrode 121.

For example, a part of the pixel electrode located in the first display region 111 and a part of the pixel electrode located in the second display region 112 are connected to each other to form the pixel electrode 122 as a whole, and a part of the common electrode located in the first display region 111 and a part of the common electrode located in the second display region 112 are connected to each other to form the common electrode 121 as a whole. The pixel electrode 122 is connected to the common driving circuit 150 configured to simultaneously drive the first display region 111 and the second display region 112. Therefore, at any instant, the first display region 111 and the second display region 112 receive the same driving signal. For example, the part of the pixel electrode located in the first display region 111 and the part of the pixel electrode located in the second display region 112 receive the same driving voltage.

As illustrated in FIG. 5A, the display subpixel 110 includes a dielectric material layer 124. The dielectric material layer 124 is provided between the liquid crystal layer 123 and the pixel electrode 122. The dielectric material layer 124 includes a first dielectric unit 127 located in the first display region 111 and a second dielectric unit 128 located in the second display region 112. The first dielectric unit 127 and the second dielectric unit 128 can be made, for example, by silicon nitride, silicon oxide, or other suitable materials.

It should be noted that, the first display region 111 and the second display region 112 are not limited to only be provided with one dielectric material, and according to actual application needs, at least two dielectric materials may be provided in each of the first display region 111 and the second display region 112. The at least two dielectric materials may be arranged in parallel in the first direction D1 or be staked in the third direction D3.

In an embodiment of the present disclosure, an equivalent dielectric constant between the pixel electrode and the common electrode in the second display region is smaller than an equivalent dielectric constant between the pixel electrode and the common electrode in the first display region. For example, the equivalent dielectric constant can be adjusted by adjusting the dielectric constant of the dielectric material layer and/or an actual thickness of the dielectric material layer.

As illustrated in FIG. 5A, in an example, a thickness of the first dielectric unit 127 (the thickness in a direction perpendicular to a panel surface direction of the display panel 100) is equal to a thickness of the second dielectric unit 128, and the dielectric constant of the first dielectric unit 127 is greater than the dielectric constant of the second dielectric unit 128. Thus, a capacitance C1 formed by the first dielectric unit 127 is greater than a capacitance C2 formed by the second dielectric unit 128. Because a capacitance $C1q1$ formed by the liquid crystal layer in the first display region 111 is equal to a capacitance $C1q2$ formed by the liquid crystal layer in the second display region 112, $C1q1/C1<C1q2/C2$. According to a voltage division principle of series capacitors, the larger the capacitance is, the smaller the divisional voltage is. Therefore, a divisional voltage of the capacitance formed by the liquid crystal layer in the first display region 111 is greater than a divisional voltage of the capacitance formed by the liquid crystal layer in the second display region 112. In this case, in the case where the common driving circuit 150 applies the driving voltage to the pixel electrode 122, the liquid crystal driving electric field formed by the pixel electrode 122 and the common electrode 121 in the second display region 112 is smaller than the liquid crystal driving electric field formed by the pixel electrode 122 and the common electrode 121 in the first display region 111. Therefore, the transmissivity of the part of the liquid crystal layer 123 located in the second display region 112 is greater than the transmissivity of the part of the liquid crystal layer 123 located in the first display region 111, so that the brightness of the second display region 112 is greater than the brightness of the first display region 111.

It should be noted that, the pixel electrode 122 and the common electrode 121 of the display subpixel 110 illustrated in FIG. 5A may be a plate electrode or a comb electrode. In the case where at least one of the pixel electrode 122 and the common electrode 121 is a comb electrode, the pitch distance of the comb electrode in the second display region 112 may be equal to or not equal to (for example, greater than) the pitch distance of the comb electrode in the first display region 111.

Figure 5B:
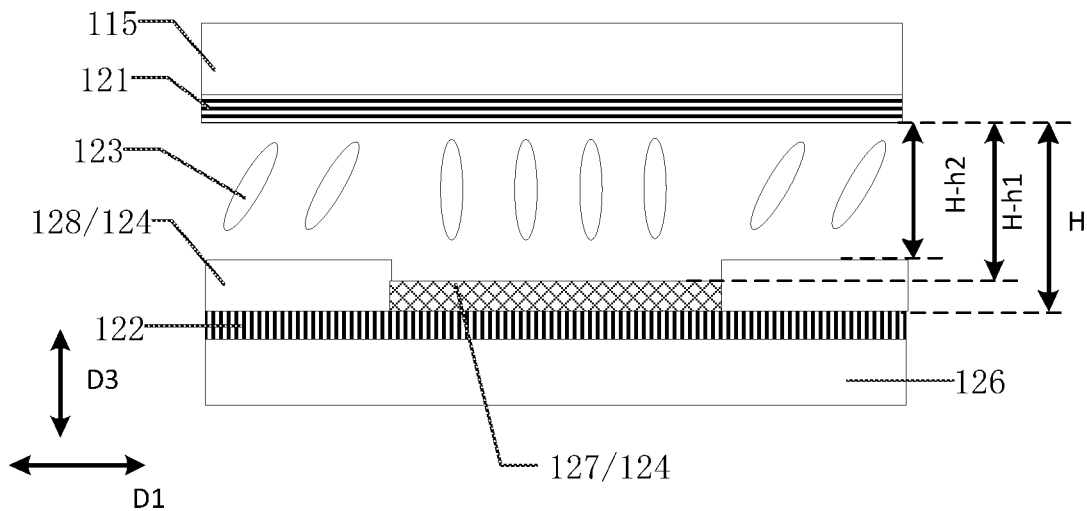
FIG. 5B is a schematic diagram of still another display subpixel provided by at least one embodiment of the present disclosure.
Figure 5C:
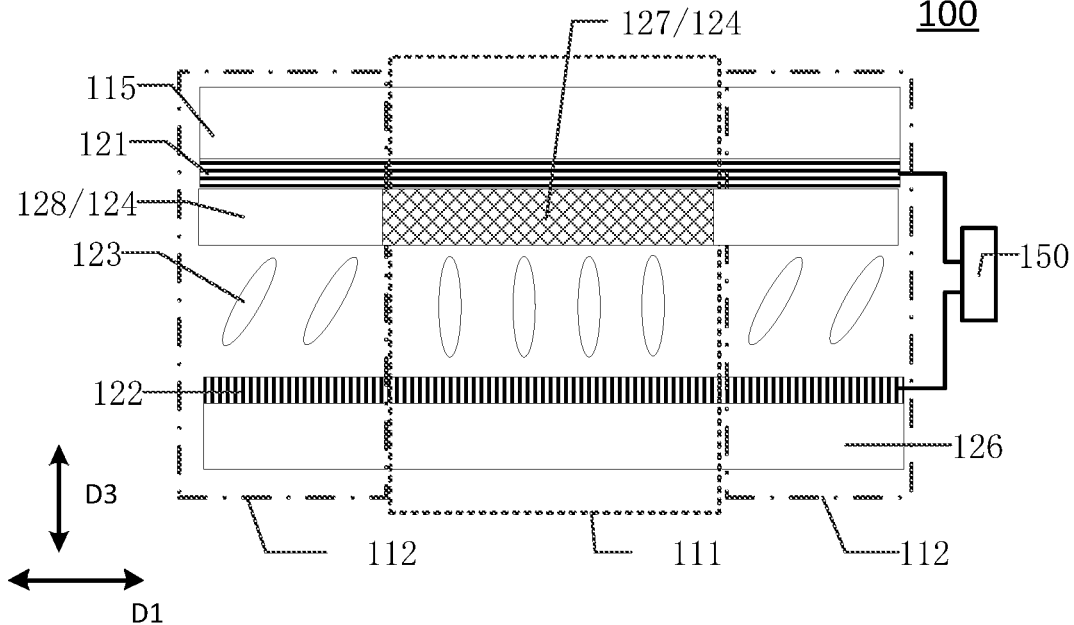
FIG. 5C is a schematic diagram of still another display subpixel provided by at least one embodiment of the present disclosure.

For example, the dielectric material layer 124 is not limited to be provided between the liquid crystal layer 123 and the pixel electrode 122, and according to actual application needs, the dielectric material layer 124 may further be provided between the liquid crystal layer 123 and the common electrode 121 (referring to FIG. 5C). In this case, in a process of the display subpixel 110 displaying a subpixel of an image, the brightness of the second display region 112 is greater than the brightness of the first display region 111. The specific reason may be referred to the embodiment illustrated in FIG. 5A, and details are not described herein again.

In another example, the display subpixel 110 can further be implemented as the display subpixel 110 illustrated in FIG. 5B. The display subpixel 110 illustrated in FIG. 5B is similar to the display subpixel 110 illustrated in FIG. 5A, and therefore, only differences are described herein, and the same parts are not described again. As illustrated in FIG. 5B, the thickness of the first dielectric unit 127 is not equal to (for example, smaller than) the thickness of the second dielectric unit 128, and the dielectric constant of the first dielectric unit 127 is equal to the dielectric constant of the second dielectric unit 128. Thus, the manufacturing process is simplified. In this case, the capacitance C1 formed by the first dielectric unit 127 is not equal to (for example, greater than) the capacitance C2 formed by the second dielectric unit 128, and the capacitance $C1q1$ formed by the liquid crystal layer in the first display region 111 is not equal to (for example, smaller than) the capacitance $C1q2$ formed by the liquid crystal layer in the second display region 112, and therefore, $C1q1/C1<C1q2/C2$. According to the voltage division principle of series capacitors, the larger the capacitance is, the smaller the divisional voltage is. Therefore, the divisional voltage of the capacitance formed by the liquid crystal layer in the first display region 111 is greater than the divisional voltage of the capacitance formed by the liquid crystal layer in the second display region 112. In this case, in the case where the common driving circuit 150 applies the driving voltage to the pixel electrode 122, the liquid crystal driving electric field formed by the pixel electrode 122 and the common electrode 121 in the second display region 112 is smaller than the liquid crystal driving electric field formed by the pixel electrode 122 and the common electrode 121 in the first display region 111. Therefore, the transmissivity of the part of the liquid crystal layer 123 located in the second display region 112 is greater than the transmissivity of the part of the liquid crystal layer 123 located in the first display region 111, so that the brightness of the second display region 112 is greater than the brightness of the first display region 111.

It should be noted that, for the display panel illustrated in FIG. 5B, according to actual application needs, the dielectric constant of the first dielectric unit 127 may further be not equal to the dielectric constant of the second dielectric unit 128, as long as the equation that $C1q1/C1 < C1q2/C2$ is satisfied, that is, $\varepsilon d1 (H/h1-1) > \varepsilon d2 (H/h2-1)$ is satisfied. Herein, $\varepsilon d1 (H/h1-1)$ is the equivalent dielectric constant of the first dielectric unit 127, $\varepsilon d2 (H/h2-1)$ is the equivalent dielectric constant of the second dielectric unit 128, $\varepsilon d1$ is the dielectric constant of the first dielectric unit 127, $\varepsilon d2$ is the dielectric constant of the second dielectric unit 128, h1 is the thickness of the first dielectric unit 127, h2 is the thickness of the second dielectric unit 128, and H is the interval distance between the pixel electrode 122 and the common electrode 121.

For example, the thickness h1 of the first dielectric unit 127 and the thickness h2 of the second dielectric unit 128 may be designed according to actual application needs, which are not specifically limited in the embodiments of the present disclosure. For example, the thickness h1 of the first dielectric unit 127 may be equal to zero, that is, the first dielectric unit 127 is not provided in the first display region 111.

For example, in order to provide effects such as protection, supporting, etc., the display subpixel 110 illustrated in FIG. 4A and FIG. 5A-FIG. 5C further includes a first substrate 115 and a second substrate 126. The first substrate 115 and the second substrate 126 may be glass substrates, quartz substrates, plastic substrates (for example, polyethylene terephthalate (PET) substrates), or substrates made of other suitable materials. As illustrated in FIG. 4A and FIG. 5A—FIG. 5C, the first substrate 115 and the second substrate 126 may be provided at two sides of the display pixel. The first substrate 115 is provided, for example, on a side of the common electrode 121 away from the pixel electrode 122, and the second substrate 126 is provided, for example, on a side of the pixel electrode 122 away from the common electrode 121.

For the display subpixel 110 illustrated in FIG. 4A and FIG. 5A-FIG. 5C, in a case where the pixel electrode 122 located in the first display region 111 and the pixel electrode 122 located in the second display region 112 are both connected to the common driving circuit 150 which is configure to simultaneously drive the first display region 111 and the second display region 112, in a process of the display subpixel 110 displaying a subpixel of an image, the brightness of the second display region 112 is greater than the brightness of the first display region 111. Thus, the size of the human eye viewing region can be increased without increasing the complexity of the driving circuit of the display panel 100.

Figure 6:
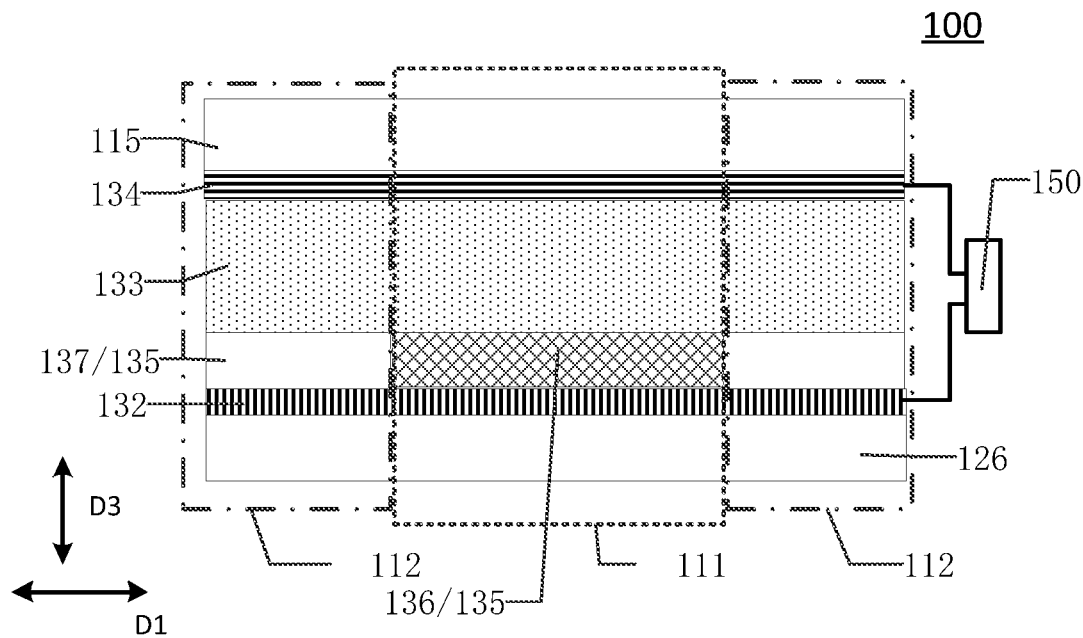
FIG. 6 is a schematic diagram of still another display subpixel provided by at least one embodiment of the present disclosure.

For example, the display array layer provided by the embodiments of the present disclosure may further be implemented as an organic light emitting diode (OLED) display panel according to actual application needs. For example, the display subpixel 110 may be implemented as the display subpixel 110 illustrated in FIG. 6. As illustrated in FIG. 6, the display subpixel 110 includes an OLED located in the first display region 111 and the second display region 112. A part of the OLED located in the first display region 111 and a part of the OLED located in the second display region 112 are electrically connected to each other and are configured to receive an identical driving voltage. For example, the OLED may be connected to the common driving circuit 150 which is configured to simultaneously drive the first display region 111 and the second display region 112. The OLED includes an anode 132, a resistance layer 135, a light emitting layer 133, and a cathode 134, which are sequentially provided. For example, a part of the anode in the first display region 111 and a part of the anode in the second display region 112 are connected to each other to form the anode 132 as a whole. The resistance layer 135 includes a first resistance unit 136 and a second resistance unit 137, and a resistivity of the second resistance unit 137 is smaller than a resistivity of the first resistance unit 136. In this case, the resistivity of the part of the OLED in the second display region 112 is smaller than the resistivity of the part of the OLED in the first display region 111. It is known from Ohm's law that a current through a conductor is directly proportional to a voltage applied to two ends of the conductor, and is inversely proportional to a resistance of the conductor. Therefore, in the case where the same driving voltage is applied to the OLED located in the first display reign 111 and in the second display region 112 (the same driving voltage is applied by the common driving circuit 150), a driving current density formed by the part of the OLED in the second display region 112 is greater than a driving current density formed by the part of the OLED in the first display region 111. Thus, the brightness of the second display region 112 is greater than the brightness of the first display region 111. For example, the first resistance unit 136 and the second resistance unit 137 may be made of different metals. For example, the resistivity of the metal forming the second resistance unit 137 is smaller than the resistivity of the metal forming the first resistance unit 136.

For example, according to actual application needs, the display subpixel 110 illustrated in FIG. 6 may further include a functional layer, which includes one layer or more layers of a hole transport layer, an electron transport layer, a hole injection layer, an electron injection layer, etc. For example, in a case where the display subpixel 110 includes the functional layer, the display subpixel 110 may not need to be provided with the resistance layer 135, but may realize that the resistivity of the part of the OLED in the second display region 112 is smaller than the resistivity of the part of the OLED in the first display region 111 by enabling the resistivity of the part of the functional layer in the second display region 112 to be smaller than the resistivity of the part of the functional layer in the first display region 111. Thereby, the manufacturing process can be simplified and the thickness of the display panel can be reduced. Tor example, the material of the part of the electron injection layer in the first display region 111 may be different from the material of the part of the electron injection layer in the second display region 112. Thereby, the resistivity of the part of the OLED in the second display region 112 is not equal to (for example, smaller than) the resistivity of the part of the OLED in the first display region 111.

For example, the anode 132 may be made of a metal, an alloy, or a combination of a metal, an alloy, and an oxide having a good electrical conductivity. The anode 132 may be made, for example, of at least one of the following materials: Ag, Au, Pd, Pt, Ag:Au (i.e., an alloy of Ag and Au), Ag:Pd, Ag:Pt, Al:Au, Al:Pd, Al:Pt, Ag:Au, Ag/Pd (i.e., a stack of Ag and Pd), Ag/Pt, Ag/ITO, Ag/IZO, Al/Au, Al/Pd, Al/Pt, Al/ITO, Al/IZO, Ag:Pd/ITO, Ag:Pt/ITO, Al:Au/ITO, Al:Pd/

ITO, Al:Pt/ITO, Ag:Au/ITO, Ag:Pd/IZO, Ag:Pt/IZO, Al:Au/IZO, Al:Pd/IZO, Al:Pt/IZO, Ag:Au/IZO, etc.

For example, the cathode 134 can be made of a material having a low work function. The cathode 134 may be made, for example, of at least one of the following materials: magnesium (Mg), calcium (Ca), indium (In), lithium (Li), aluminum (Al), silver (Ag), or alloys thereof or fluorides thereof, for example, a magnesium (Mg)-silver (Ag) alloy, a lithium (Li)-fluorine compound, a lithium (Li)-oxygen (O) compound, etc.

For example, in order to provide effects such as protection, supporting, etc., the display subpixel 110 further includes a first substrate 115 and a second substrate 126. The first substrate 115 and the second substrate 126 may be glass substrates, quartz substrates, plastic substrates (for example, polyethylene terephthalate (PET) substrates), or substrates made of other suitable materials.

For the display subpixel 110 illustrated in FIG. 6, in a case where the part of the OLED located in the first display region 111 and the part of the OLED located in the second display region 112 are both connected to the common driving circuit 150 configured to simultaneously drive the first display region 111 and the second display region 112, in a process of the display subpixel 110 displaying a subpixel of an image, the brightness of the second display region 112 is greater than the brightness of the first display region 111. Thereby, the size of the human eye viewing region can be increased without increasing the complexity of the driving circuit of the display panel 100.

Figure 7:
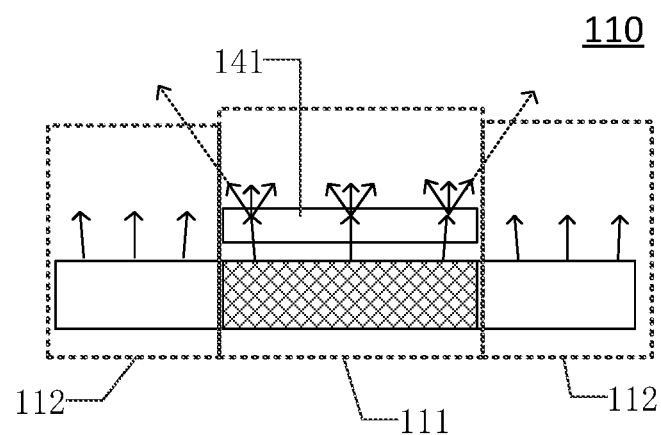
FIG. 7 is a schematic diagram of still another display subpixel provided by at least one embodiment of the present disclosure.

For example, according to actual application needs, the display subpixel 110 can further be implemented as the display subpixel 110 of FIG. 7. As illustrated in FIG. 7, the display subpixel 110 further includes a light dispersion structure 141 provided in the first display region 111. For example, the light dispersion structure 141 is a scattering structure, which includes a structure of unevenness, a prism structure, etc. The light dispersion structure 141 is configured to diffuse light emitted from the first display region 111 into the second display region 112, so that, in a process of the display subpixel 110 displaying a subpixel of an image, the brightness of the second display region 112 is greater than the brightness of the first display region 111. The display subpixel 110 further includes a common driving circuit 150 configured to simultaneously drive the first display region 111 and the second display region 112, and the part of the display subpixel 110 located in the first display region 111 and the part of the display subpixel 110 located in the second display region 112 are electrically connected to each other and are both connected to the common driving circuit 150. Thereby, the display subpixel 110 of FIG. 7 can increase the size of the human eye viewing region without increasing the complexity of the driving circuit of the display panel 100.

It should be noted that, according to actual application needs, the first display region 111 of the display subpixel illustrated in FIG. 4A, FIG. 5A to FIG. 5C, and FIG. 6 may further be provided with the light dispersion structure 141. Thereby, the ratio of the brightness of the second display region 112 to the brightness of the first display region 111 can be further increased, and thus, the size of the human eye viewing region can be further increased without increasing the complexity of the driving circuit of the display panel 100.

Figure 8A:
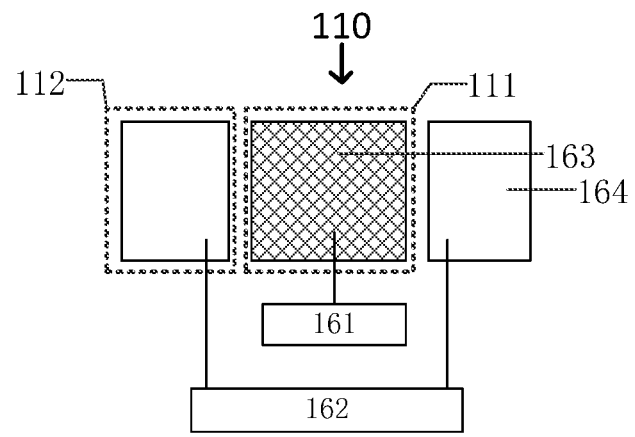
FIG. 8A is a schematic diagram of still another display subpixel provided by at least one embodiment of the present disclosure.
Figure 8B:
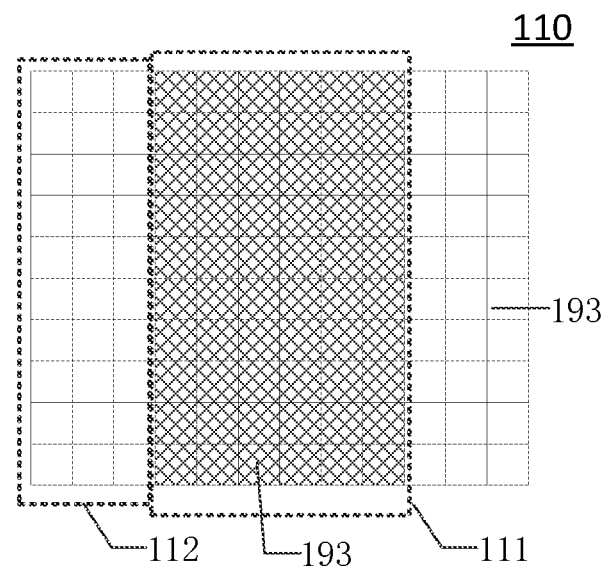
FIG. 8B is a schematic diagram of still another display subpixel provided by at least one embodiment of the present disclosure.

For example, according to actual application needs, the display subpixel 110 may further be implemented as the display subpixel 110 of FIG. 8A. As illustrated in FIG. 8A and FIG. 8B, the display subpixel 110 includes a first driving circuit 161 and a second driving circuit 162 which are at least partially independent and are configured to drive the first display region 111 and the second display region 112, respectively. The first driving circuit 161 and the second driving circuit 162 may supply different driving signals (data signals) to the first display region 111 and the second display region 112 in a display process. Thereby, in a process of the display subpixel 110 displaying a subpixel of an image, the brightness of the second display region 112 is greater than the brightness of the first display region 111. Thus, the size of the human eye viewing region can be increased.

The first driving circuit 161 and the second driving circuit 162 which are configured to drive the first display region 111 and the second display region 112, respectively, may be completely independent from each other. The first driving circuit 161 and the second driving circuit 162 are connected to different gate lines and different data lines, so that the first driving circuit 161 and the second driving circuit 162 are controlled and are applied with driving signals by these different gate lines and different data lines.

Alternatively, the first driving circuit 161 and the second driving circuit 162 may share a part of the circuit. However, the first driving circuit 161 and the second driving circuit 162 have at least different output terminals, for example, to be connected to different pixel electrodes, so that the first display region 111 and the second display region 112 can be driven separately.

For example, in a case where the display subpixel 110 is implemented as a liquid crystal sub-pixels illustrated in FIG. 8A, the display subpixel 110 includes a first pixel electrode 163 and a second pixel electrode 164 located in the first display region 111 and the second display region 112, respectively, which are different and are insulated from each other, and the first pixel electrode 163 and the second pixel electrode 164 are electrically connected to the first driving circuit 161 and the second driving circuit 162, respectively. For example, the first driving circuit 161 includes a first switching transistor, and the second driving circuit 162 includes a second switching transistor. The first switching transistor and the second switching transistor are connected to the same gate line but connected to different data lines. Therefore, the first switching transistor and the second switching transistor can share the same gate electrode, but have different source electrodes and drain electrodes, so that the first display region 111 and the second display region 112 can be simultaneously driven. Alternatively, the first switching transistor and the second switching transistor are connected to the same data line but connected to different gate lines. Therefore, the first switching transistor and the second switching transistor can share the same source electrode (or drain electrode) connected to the data line (for example, the same data line), but have different gate electrodes and different drain electrodes (or source electrodes), so that the first switching transistor and the second switching transistor can be time divisionally controlled to drive the first display region 111 and the second display region 112, respectively.

For another example, in a case where the display subpixel 110 is implemented as the OLED sub-pixel, the display subpixel 110 includes a first anode and a second anode located in the first display region 111 and the second display region 112, respectively, which are different and are insulated from each other, and the first anode and the second anode are electrically connected to the first driving circuit 161 and the second driving circuit 162, respectively. In this case, the first display region 111 and the second display region 112 may have a common cathode (for example, the cathode located in the first display region 111 and the cathode located in the second display region 112 are electrically connected to each other and are integrally formed). For another example, according to actual application needs, in the case where the display subpixel 110 is implemented as the OLED sub-pixel, the display subpixel 110 includes a first cathode and a second cathode located in the first display region 111 and the second display region 112, respectively, which are different and are insulated from each other, and the first cathode and the second cathode are electrically connected to the first driving circuit 161 and the second driving circuit 162, respectively. In this case, the first display region 111 and the second display region 112 may have a common anode (for example, the anode located in the first display region 111 and the anode located in the second display region 112 are electrically connected to each other and are integrally formed). Similar to the case of the liquid crystal sub-pixel, the first switching transistor included in the first driving circuit 161 and the second switching transistor included in the second driving circuit 162 may share a part of electrodes to simultaneously or time divisionally drive the first display region 111 and the second display region 112. For another example, the first driving circuit 161 further includes components such as a first driving transistor, a first light emitting control transistor, etc., the second driving circuit 162 includes components such as a second driving transistor, a second light emitting control transistor, etc., and these driving transistors, light emitting control transistors, and etc., may further be at least partially identical, which is not described in detail herein.

For example, as illustrated in FIG. 8B, according to actual application needs, the first display region 111 and the second display region 112 may respectively include a plurality of sub-subpixels 193 which are independently driven. By controlling the intensity of the light emitted from each of the sub-subpixels 193, the brightness of the second display region 112 can be greater than the brightness of the first display region 111. For example, according to actual application needs, the sub-subpixel 193 can include a micro LED or a micro OLED. For example, the size of the sub-subpixel can be designed according to actual needs and process level, and the size of the sub-subpixel can be, for example, in a range of 5 micrometers to 50 micrometers.

Figure 9:
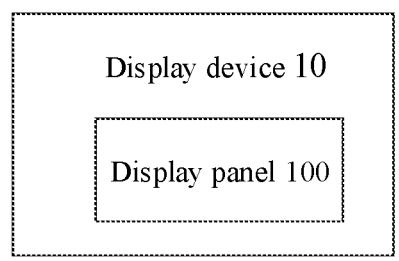
FIG. 9 is an exemplary block diagram of a display device provided by at least one embodiment of the present disclosure.

For example, FIG. 9 is an exemplary block diagram of a display device 10 provided by at least one embodiment of the present disclosure. The display device 10 includes the display panel 100 according to any one of the embodiments of the present disclosure. For example, the display device 10 can be implemented as any product or component having a 3D display function, such as a mobile phone, a tablet computer, a television, a display, a notebook computer, a digital photo frame, a navigator, etc.

It should be noted that, for other components of the display panel 100 and the display device 10 (for example, a thin film transistor, a control device, an image data encoding/decoding device, a line scanning driver, a column scanning driver, a clock circuit, etc.), applicable components may be adopted, which are understood by those skilled in the art, and are not described herein, and should not be construed as limitation to the present disclosure. The display device 10 can increase the size of the human eye viewing region.

At least one embodiment of the present disclosure provides a method of driving a display panel, which includes: applying a first display data voltage to a first display region of a display subpixel of the display panel; and applying a second display data voltage to a second display region of the display subpixel of the display panel. In a process of displaying a subpixel of an image, brightness of the second display region is greater than brightness of the first display region; and the first display region is located at a middle part of the display subpixel and the second display region is located at two sides of the first display region in a first direction.

In an example, the first display data voltage is different from the second display data voltage. In this case, the display subpixel includes a first driving circuit and a second driving circuit which are at least partially independent and are configured to drive the first display region and the second display region, respectively; and the first display data voltage is applied to the first display region through the first driving circuit, and the second display data voltage is applied to the second display region through the second driving circuit.

In another example, the first display data voltage is equal to the second display data voltage. In this case, the display subpixel includes a common driving circuit configured to simultaneously drive the first display region and the second display region; and the common driving circuit applies the first display data voltage to the first display region, and applies the second display data voltage to the second display region.

Figure 10:
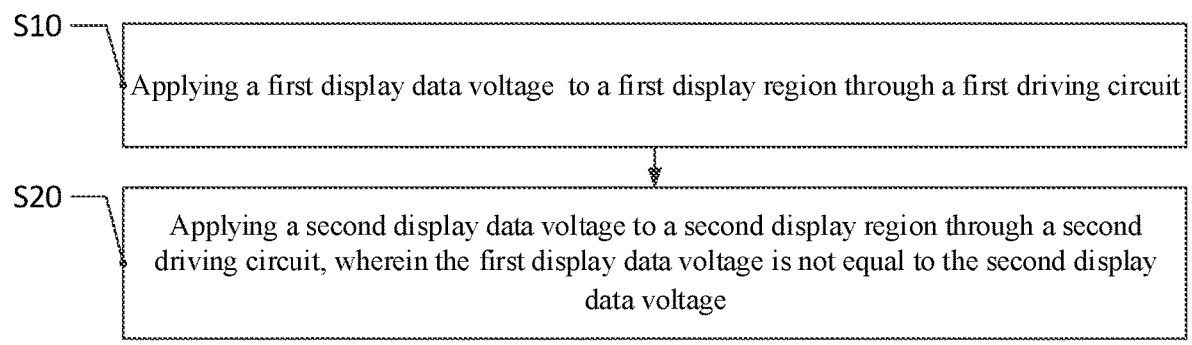
FIG. 10 is an exemplary flowchart of a method of driving a display panel provided by at least one embodiment of the present disclosure.

For example, taking the embodiment illustrated in FIG. 8A and FIG. 8B as an example, as illustrated in FIG. 10, the method may include following steps.

In step S10, the first display data voltage is applied to the first display region through the first driving circuit.

In step S20, the second display data voltage is applied to the second display region through the second driving circuit. Here, the first display data voltage is not equal to the second display data voltage.

By enabling that the first display data voltage applied to the first display region is not equal to (for example, greater than) the second display data voltage applied to the second display region, in a process of displaying a subpixel of an image, the brightness of the second display region is greater than the brightness of the first display region. Thereby, the method can increase the size of the human eye viewing region of the display panel and the display device including the display panel.

Although detailed description has been given above to the present disclosure with general description and embodiments, it is apparent to those skilled in the art that some modifications or improvements may be made on the basis of the embodiments of the present disclosure. Therefore, all the modifications or improvements made without departing from the spirit of the present disclosure shall all fall within the protection scope of the present disclosure.

What are described above is related to illustrative embodiments of the disclosure only, and not limitative to the protection scope of the present disclosure. The protection scope of the present disclosure should be defined by the accompanying claims.

What is claimed is:
1. A display panel, comprising:
at least one display subpixel,
wherein: the display subpixel comprises a first display region located at a middle part of the display subpixel and a second display region located at two sides of the first display region in a first direction; and
the display subpixel is configured to enable brightness of the second display region to be greater than brightness of the first display region in a case of displaying an image, wherein: the display panel is a liquid crystal display panel, the display subpixel comprises a pixel electrode and a common electrode which are both located in the first display region and the second display region, a part of the pixel electrode located in the first display region is electrically connected to a part of the pixel electrode located in the second display region, and a part of the common electrode located in the first display region is electrically connected to a part of the common electrode located in the second display region;

the display subpixel comprises a liquid crystal layer and a dielectric material layer;

the dielectric material layer is between the liquid crystal layer and the pixel electrode or between the liquid crystal layer and the common electrode, and the dielectric material layer comprises a first dielectric unit located in the first display region and a second dielectric unit located in the second display region; and an equivalent dielectric constant of the second dielectric unit is smaller than an equivalent dielectric constant of the first dielectric unit.

2. The display panel according to claim 1, wherein: the display panel is a liquid crystal display panel, the display subpixel comprises a pixel electrode and a common electrode which are both located in the first display region and the second display region, a part of the pixel electrode located in the first display region is electrically connected to a part of the pixel electrode located in the second display region, and a part of the common electrode located in the first display region is electrically connected to a part of the common electrode located in the second display region; and in a case where an identical driving voltage is applied to the part of the pixel electrode located in the first display region and the part of the pixel electrode located in the second display region, a liquid crystal driving electric field formed by the pixel electrode and the common electrode in the second display region is not equal to a liquid crystal driving electric field formed by the pixel electrode and the common electrode in the first display region.

3. The display panel according to claim 2, wherein, in a case where the identical driving voltage is applied to the part of the pixel electrode located in the first display region and the part of the pixel electrode located in the second display region, the liquid crystal driving electric field formed by the pixel electrode and the common electrode in the second display region is smaller than the liquid crystal driving electric field formed by the pixel electrode and the common electrode in the first display region.

4. The display panel according to claim 2, wherein, in a case where the identical driving voltage is applied to the part of the pixel electrode located in the first display region and the part of the pixel electrode located in the second display region, the liquid crystal driving electric field formed by the pixel electrode and the common electrode in the second display region is greater than the liquid crystal driving electric field formed by the pixel electrode and the common electrode in the first display region.

5. The display panel according to claim 4, wherein at least one of the pixel electrode and the common electrode is a comb electrode, and a pitch distance of a part of the comb electrode in the second display region is smaller than a pitch distance of a part of the comb electrode in the first display region.

6. The display panel according to claim 1, wherein a thickness of the second dielectric unit is equal to a thickness of the first dielectric unit, and a dielectric constant of the second dielectric unit is smaller than a dielectric constant of the first dielectric unit.

7. The display panel according to claim 1, wherein: the display subpixel further comprises a light dispersion structure provided on a light emitting side of the first display region; and the light dispersion structure is configured to diffuse light emitted from the first display region into the second display region.

8. The display panel according to claim 1, wherein the display subpixel comprises a common driving circuit configured to simultaneously drive the first display region and the second display region.

9. The display panel according to claim 1, wherein the display subpixel comprises a first driving circuit and a second driving circuit which are at least partially independent and are configured to drive the first display region and the second display region, respectively.

10. The display panel according to claim 9, wherein the display subpixel comprises a first pixel electrode located in the first display region and a second pixel electrode located in the second display region;

the first pixel electrode is insulated from the second pixel electrode; and the first pixel electrode and the second pixel electrode are electrically connected to the first driving circuit and the second driving circuit, respectively.

11. The display panel according to claim 1, wherein the brightness of the second display region is 1.05~1.25 times as large as the brightness of the first display region.

12. The display panel according to claim 1, wherein: a size of the second display region in the first direction is smaller than a size of the display subpixel in the first direction; and a ratio of the size of the second display region in the first direction to the size of the display subpixel in the first direction is 0.01~0.5.

13. The display panel according to claim 1, further comprising a parallax barrier, wherein: the at least one display subpixel comprises a plurality of display subpixels;

the parallax barrier is on a light emitting side of the display subpixel and comprises light shielding regions and light transmission regions which are alternately arranged in the first direction; and the plurality of display subpixels are arranged in parallel in the first direction.

14. The display panel according to claim 13, wherein: the size of the second display region in the first direction is smaller than or equal to a size of a light transmission region in the first direction; and a ratio of the size of the second display region in the first direction to the size of the light transmission region in the first direction is 0.7~1.

15. A display panel, comprising:

at least one display subpixel, wherein: the display subpixel comprises a first display region located at a middle part of the display subpixel and a second display region located at two sides of the first display region in a first direction; and the display subpixel is configured to enable brightness of the second display region to be greater than brightness of the first display region in a case of displaying an image, and wherein: the display panel is an organic light emitting diode display panel, the display subpixel comprises an organic light emitting diode located in the first display region and the second display region;

a part of the organic light emitting diode located in the first display region is electrically connected to a part of the organic light emitting diode located in the second display region, and the part of the organic light emitting diode located in the first display region and the part of the organic light emitting diode located in the second display region are configured to receive an identical driving voltage; and in a case where the identical driving voltage is applied to the part of the organic light emitting diode located in the first display region and the part of the organic light emitting diode located in the second display region, a density of a driving current formed by the organic light emitting diode in the second display region is greater than a density of a driving current formed by the organic light emitting diode in the first display region.

16. The display panel according to claim 15, wherein the display panel is an organic light emitting diode display panel, the display subpixel comprises an organic light emitting diode located in the first display region and the second display region, a part of the organic light emitting diode located in the first display region is electrically connected to a part of the organic light emitting diode located in the second display region, and a resistivity of the part of the organic light emitting diode located in the second display region is smaller than a resistivity of the part of the organic light emitting diode located in the first display region.

17. A method of driving a display panel, comprising:

applying a first display data voltage to a first display region of a display subpixel of the display panel; and applying a second display data voltage to a second display region of the display subpixel of the display panel, wherein: in a process of displaying an image, brightness of the second display region is greater than brightness of the first display region;

the first display region is located at a middle part of the display subpixel, and the second display region is located at two sides of the first display region in a first direction;

the display panel is a liquid crystal display panel, the display subpixel comprises a pixel electrode and a common electrode which are both located in the first display region and the second display region, a part of the pixel electrode located in the first display region is electrically connected to a part of the pixel electrode located in the second display region, and a part of the common electrode located in the first display region is electrically connected to a part of the common electrode located in the second display region;

the display subpixel comprises a liquid crystal layer and a dielectric material layer;

the dielectric material layer is between the liquid crystal layer and the pixel electrode or between the liquid crystal layer and the common electrode, and the dielectric material layer comprises a first dielectric unit located in the first display region and a second dielectric unit located in the second display region; and an equivalent dielectric constant of the second dielectric unit is smaller than an equivalent dielectric constant of the first dielectric unit.

18. The method of driving the display panel according to claim 17, wherein: the first display data voltage is different from the second display data voltage;

the display subpixel comprises a first driving circuit and a second driving circuit which are at least partially independent and are configured to drive the first display region and the second display region, respectively; and the first display data voltage is applied to the first display region through the first driving circuit, and the second display data voltage is applied to the second display region through the second driving circuit.

19. The method of driving the display panel according to claim 17, wherein: the first display data voltage is equal to the second display data voltage;

the display subpixel comprises a common driving circuit configured to simultaneously drive the first display region and the second display region; and the common driving circuit applies the first display data voltage to the first display region, and applies the second display data voltage to the second display region.

* * * * *